June 3, 1958 C. K. COLE ET AL 2,836,949
REEL TYPE POWER MOWER
Filed July 28, 1955 4 Sheets-Sheet 1

INVENTOR.
CLAYTON K. COLE
ABRAHAM J. OORBECK
BY
ATTORNEY

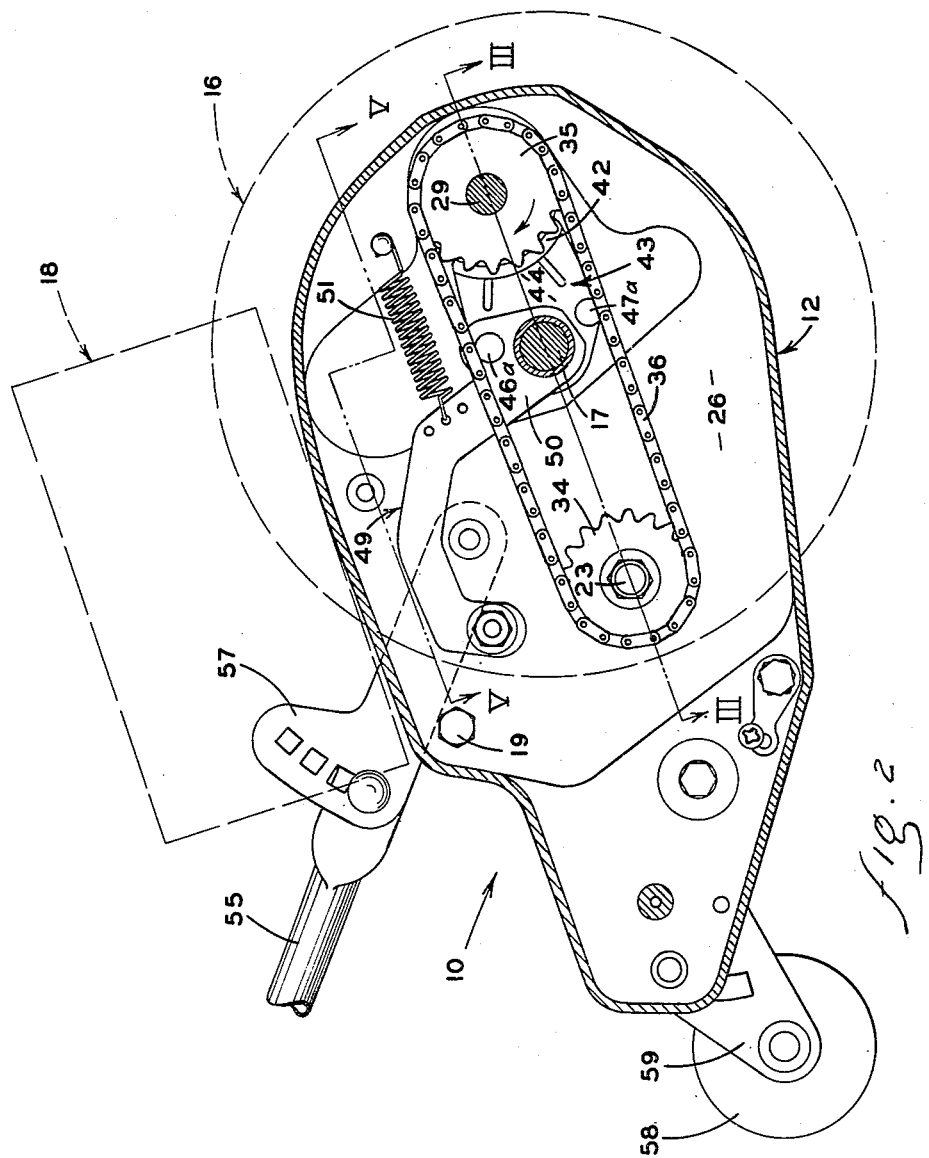

June 3, 1958 C. K. COLE ET AL 2,836,949
REEL TYPE POWER MOWER
Filed July 28, 1955 4 Sheets-Sheet 3

INVENTOR.
CLAYTON K. COLE
ABRAHAM J. OORBECK
BY
ATTORNEY

United States Patent Office 2,836,949
Patented June 3, 1958

2,836,949

REEL TYPE POWER MOWER

Clayton K. Cole, Kalamazoo, and Abraham J. Oorbeck, Cooper Township, Kalamazoo County, Mich., assignors to Atlas Press Company, Kalamazoo, Mich., a corporation of Michigan Application July 28, 1955, Serial No. 524,969

10 Claims. (Cl. 56—26)

This invention relates to a lawn mower having a power driven cutting mechanism which is connected by a power translating device, including a clutch, to the ground engaging wheels of the mower, said clutch being controlled by the mower handle.

In power driven lawn mowers, it is already customary to connect the ground engaging wheels to the power unit by a coupling device including a clutch. The cutting mechanism is then either coupled to, and driven by, the wheels or is connected to a separate power unit by another coupling device independent of said wheels. If the cutting mechanism, such as a cutting reel, is driven by or through the wheels, it will stop every time the wheels are stopped and thereby limit the utility of the mower, especially when used in close quarters. Independent operation of the reel complicates the mower and increases both its cost and weight. Thus, neither of these arrangements has proven entirely satisfactory.

It is also already customary to place a clutch in the coupling device between the power unit and the wheels, and to provide this clutch with an independent clutch lever or pedal which must be operated by hand to uncouple the power unit from the elements driven thereby. With this arrangement, the mower operator must remove one hand from the mower handle in order to stop the mower. It is not unusual that the mower's forward progress must be stopped quickly because of an emergency. Thus, with present mowers the operator must release 50% of his control over the mower in order to stop it just when full control is most needed.

Accordingly, a primary object of this invention has been the provision of an improved, power driven lawn mower wherein the motive power is transmitted, in series, through a cutting mechanism, through a power translating device including a clutch operable by the mower handle and then to the ground engaging wheels of the mower, the handle and clutch being so arranged that downward movement of the handle operates the clutch to uncouple the ground engaging wheels from the power supplied thereto.

A further object of this invention is the provision of a lawn mower, as aforesaid, wherein the propulsion of the mower can be quickly and easily stopped by appropriate movement of the mower handle without stopping the operation of the cutting mechanism.

A further object of this invention is the provision of an improved power translating device including a clutch for a power driven, reel type, mower wherein said device is caused to drivingly connect the ground engaging wheels of the mower to the reel, for receiving power therefrom, by movement of the mower handle.

A further object of this invention is the provision of a power translating device, as aforesaid, which is sturdy in construction, simple in operation and requires a minimum of working parts, said parts being conveniently contained within a housing provided by the framework at one end of the mower.

Other objects and purposes of the invention will become apparent to persons familiar with this type of equipment upon reading the following specification and examining the accompanying drawings, in which:

Figure 2 is an enlarged sectional view substantially as taken along the line II—II of Figure 1.

Figure 1:
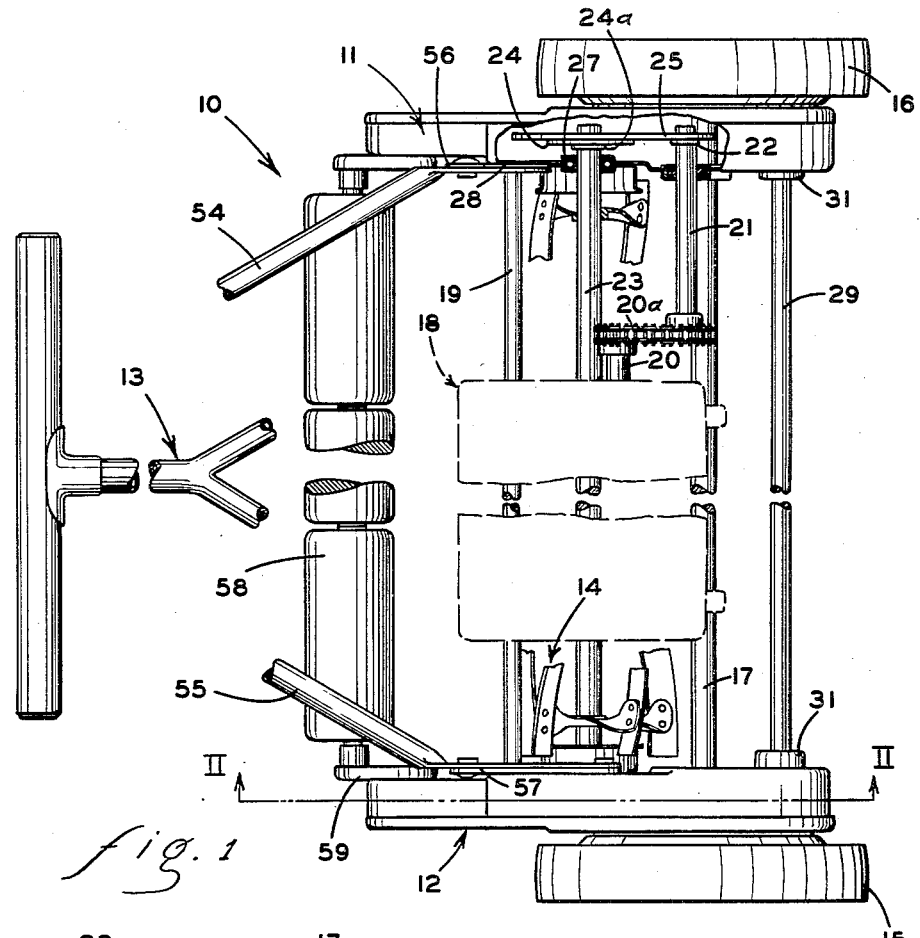
Figure 1 is a broken, top plan view of a reel type lawn mower including the invention.

In meeting the objects set forth above, as well as others related thereto, we have provided a reel type lawn mower 10 (Figures 1 and 2) having a pair of frame end members 11 and 12 which support the mower handle 13, the cutting reel 14, and an axle 17 rotatably mounting a pair of ground engaging wheels 15 and 16 at its opposite ends. The reel 14 is driven by a power unit 18 and the ground engaging wheels 15 and 16 are disconnectibly driven by the reel 14, both in a manner hereinafter disclosed in detail.

For the purposes of convenience in description, the terms "upper," "lower," "front," "rear," "left," "right" and derivatives thereof are used herein with respect to the mower and parts associated therewith when the mower is disposed upon the ground in its normal operating position and as viewed by a person holding the mower handle for the purpose of operating the mower. The terms "inner," "outer" and derivatives thereof have reference to the geometric center of the mower and parts associated therewith.

Construction

The frame of the mower 10 (Figures 1 and 2) is comprised of a pair of frame end members or housings 11 and 12 which are held in substantially parallel relationship by means including the dead axle 17 and the brace rod 19, both of which extend between, and are nonrotatably secured to said end members 11 and 12. The power unit 18, which may be a gasoline engine, is mounted upon the brace rod 19 and the axle 17 in any convenient, conventional manner. A first power shaft 20 extends from the power unit 18 to a sprocket and chain assembly 20a through and by which is driven a second power shaft 21. This shaft extends into the left end housing 11 where it supports a sprocket 22. The corresponding end of the reel shaft 23 also extends through the inner wall 28 of the housing 11 where it supports another sprocket 24. The sprockets 22 and 24 are interconnected by a chain 25. A safety release clutch 24a, of any desired type, may be provided in the hub of one of these sprockets, as the sprocket 24. It will be apparent that other coupling means may be used to connect the reel 14 to the power unit 18 within the scope of this invention.

Figure 3:
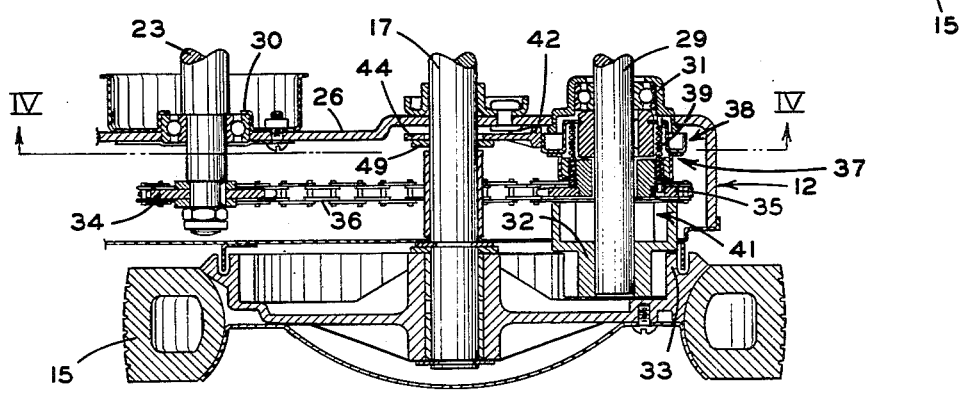
Figure 3 is a sectional view substantially as taken along the line III—III of Figure 2.
Figure 4:
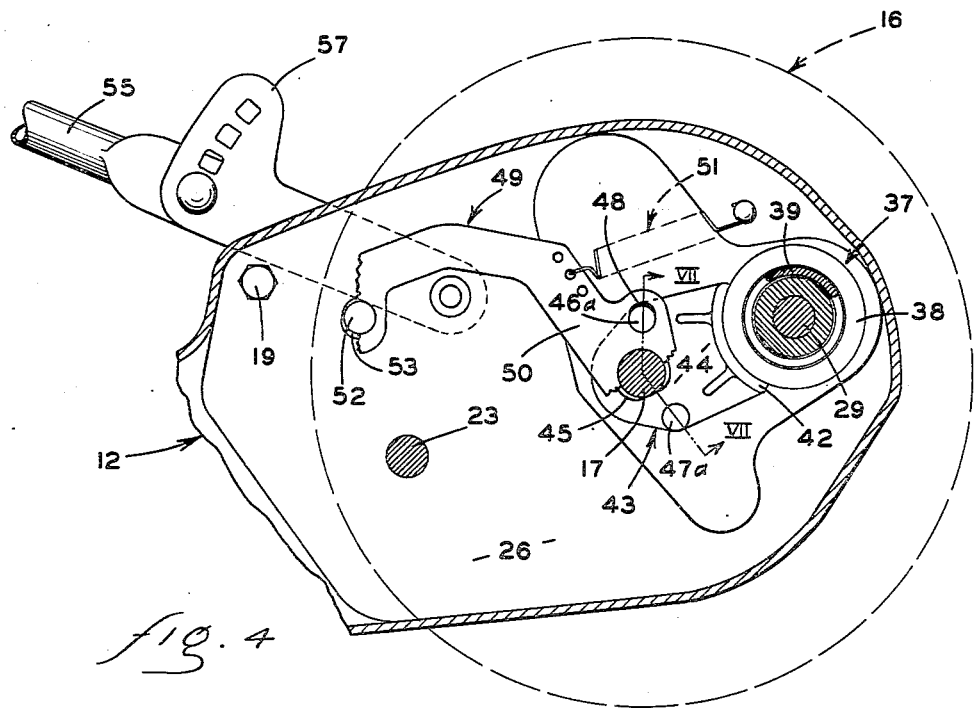
Figure 4 is a sectional view substantially as taken along the line IV—IV of Figure 3.
Figure 5:
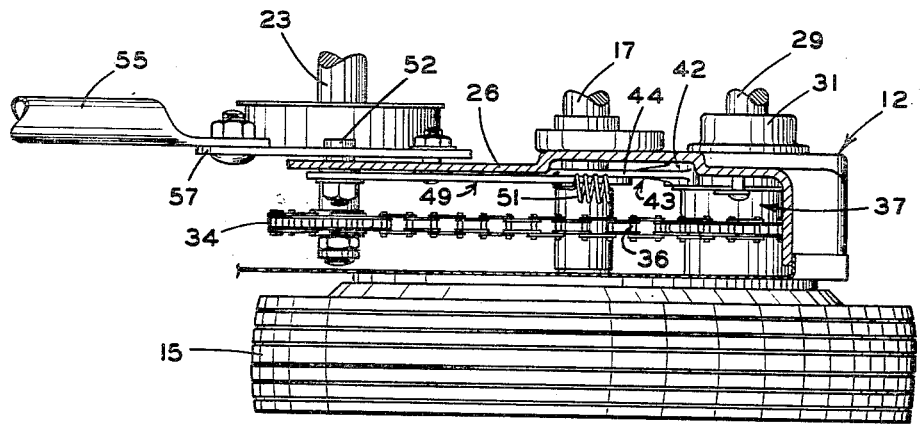
Figure 5 is a sectional view taken along the line V—V of Figure 2.

The rightward end of the reel shaft 23 extends through an appropriate opening in the inner wall 26 of the right end member 12 (Figures 3, 4 and 5). The reel shaft 23 is rotatably supported near its opposite ends by any convenient means such as the bearings 27 and 30 (Figures 1 and 3) supported upon the end members 11 and 12, respectively, in a conventional manner. The axle 17, which rotatably supports the ground engaging wheels 15 and 16 at the opposite ends thereof (Figures 1 and 3), is in this particular embodiment rigidly secured to, and extends through the frame end members 12 and 11, respectively.

A drive shaft 29 is rotatably supported near its opposite ends by means of the bearings 31 (Figures 3 and 5) mounted upon the inner walls 26 and 28. Pinions 32 are mounted upon the extreme ends of the drive shaft 29 for unidirectional movement thereby in any convenient, conventional manner. Said pinions are in continuous egagement with ring gears 33, said ring gears being mounted upon the inner sides of the wheels 15 and 16 and concentric therewith. Thus, clockwise rotation of the drive shaft 29 (Figure 2) effects a rotation of the wheels 15 and 16 as a result of the interengagement of the pinions 32 and ring gears 33. However, the pinions 32 are provided with conventional, internal mechanism 41 permitting overspeed in said clockwise direction, such as a roll-type one-way clutch.

A pair of sprockets 34 and 35 (Figures 2 and 3) are mounted upon the rightward ends of the reel shaft 23 and drive shaft 29, respectively, within the right end housing 12. The two sprockets 34 and 35 are interconnected by a chain 36. In this embodiment, the sprocket 34 is rigidly secured to the reel shaft 23 and the sprocket 35, sometimes hereinafter designated a floating sprocket, is rotatably mounted upon the drive shaft 29.

Figure 6:
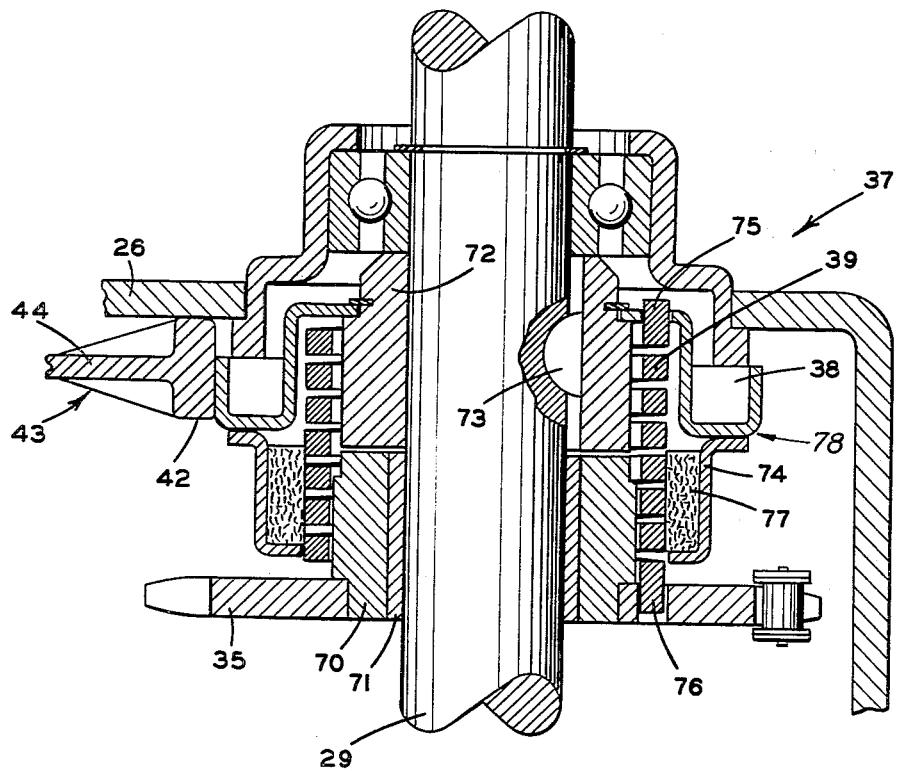
Figure 6 shows the clutch portion of Figure 3 on an enlarged scale.

A spring clutch 37 is provided and has a cylindrical member 70 (Figure 6) which is fixedly attached to the floating sprocket 35 for rotation therewith relative to the drive shaft 29. A bearing 71 is provided between member 70 and shaft 29. The spring clutch includes a second cylindrical member 72 which is keyed at 73 to the shaft 29 for rotation with said shaft. An external cylindrical clutch drum 38 is mounted on member 72 for rotation relative thereto. A housing 74 is secured to clutch drum 38 by any suitable means such as spot welding at 78 (Figure 6). A coiled clutch spring 39 is positioned inside the drum 38 and the housing 74 encircling drive shaft 29 and cylindrical members 70 and 72. The clutch spring has one of its ends 75 connected to the clutch drum 38 and the other of its ends 76 connected to sprocket 35. A lubricant filled pad 77 is located between the spring and the interior surface of housing 74. Clutch drum 38 normally tends to rotate relative to shaft 29 and member 72 when the sprocket 35 is rotated because of the connection of springs 39 to sprocket 35 and to the clutch drum. When rotation of the drum 38 is opposed by means to be described hereinbelow and the sprocket 35 is rotating, the spring 39 will be contracted and will seize upon member 72 and cause it to rotate with the sprocket 35 and act through the key 73 to drive shaft 29.

The clutch drum 38 of the clutch 37 is frictionally engageable by the arcuate clutch shoe 42 on the clutch plate 43 (Figures 3 and 4). Said clutch plate has a flat body portion 44 extending away from and, substantially perpendicular to, the axis of the clutch shoe 42. The body 44 is provided with a somewhat elliptical opening 45 (Figure 4), whose major axis extends toward the clutch shoe 42. The axle 17 extends through opening 45. The opening 45 permits the clutch plate 43 to move toward and away from the clutch drum 38 and to pivot around the axle 17. The clutch body 44 is radially aligned with the clutch drum 38 (Figure 6) and is disposed closely adjacent to the outer surface of the inner wall 26.

A pair of bosses 46 and 47 (Figures 4 and 7) are provided on one surface of the clutch shoe body 44 and extend transverse thereto. The bosses are located on opposite edges of the clutch shoe body 44 and are spaced an equal distance from and at the same angle with respect to the center of opening 45 so as to be symmetrically located with respect to said opening. Bosses 46a and 47a which are similar in all respects to bosses 46 and 47 are formed on the other surface of clutch shoe body 44.

Bosses 46 and 47 extend toward, and space said clutch shoe body 44 from, the inner wall 26. Boss 46a cooperates with an opening in the clutch arm in a manner to be hereinafter described to cause movement of the clutch shoe into or out of engagement with the clutch drum arm 49. It has been observed that one half of the arcuate shoe 42 will tend to wear faster than the other half in the normal operation of the mower. The shoe 42, which is easily replaced, is preferably, but not necessarily, fabricated from a relatively soft, non-abrasive, low-friction material, such as nylon, which will absorb the wear and will not score the drum 38 in normal use. The symmetrical arrangement of the bosses 46, 46a, 47 and 47a permits the plate 43 to be rotated 180 degrees about its longitudinal axis so that as one half becomes worn to the maximum permissible extent, the plate may be rotated to present the unworn half to the drum. Thus, the plate may be rotated so that bosses 46a and 47a act as spacers and boss 47 cooperates with the opening in the clutch arm. The life of the plate 43 is thus substantially doubled.

Figure 7:
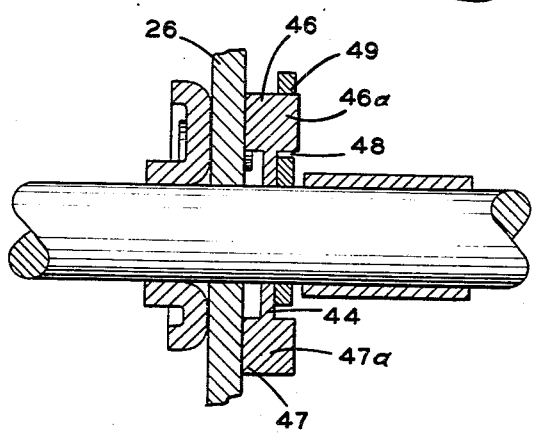
Figure 7 is an enlarged, sectional view taken along the VII—VII of Figure 4.

A flat, somewhat U-shaped clutch arm 49 (Figures 2 and 4) is pivotally supported near the free end of its front leg 50 upon the axle 17. Said arm 49 lies substantially within a single plane, in this particular embodiment, disposed outwardly of, and substantially parallel with, the shoe body 44 (Figure 7). An opening 48 (Figure 4), elongated toward said axle 17, is provided in said leg 50 to receive the outer end of the upper boss 46a on the shoe body 44. Thus, pivotal movement of the clutch arm 49 acting through the upper boss 46a will effect a movement of the clutch plate 43 toward and away from the clutch drum 38 on the clutch 37. Pivotal movement of arm 49 causes shoe 42 to pivot about shaft 17 and to move laterally of the shaft 17 because of the shape of opening 45. Since the arm 49 engages only boss 46a, the upper portion of shoe 42 (as appearing in Figures 2 and 4) will be urged into engagement with the drum 38 to a greater extent than the lower portion of the shoe. This off-center urging of the shoe 42 cooperates with the rotation of the drum 38 to substantially equalize the wear on the shoe. Resilient means, such as the spring 51, is secured at one end to the leg 50 of the clutch arm 49 and at its other end upon the inner wall 26 for the purpose of urging said leg 50, hence the clutch shoe 42, toward the clutch 37. As shown in Figure 2, the urging of the spring 51 effects an upward clockwise movement of the clutch arm 49.

The rearward leg of the clutch arm 49 is provided near its free end with an inwardly extending roller 52 which is axially parallel with the axle 17 and extends through an elongated opening 53 in the inner wall 26 (Figure 4).

The handle 13 is preferably bifurcated at its inner or frontward end to provide a pair of legs 54 and 55 which are pivotally mounted at their inner ends upon the end members 11 and 12. Said leg members are also adjustably secured to the rearward or outer ends of the levers 56 and 57 which are in turn pivotally mounted at their inner ends upon the same axes as said legs 54 and 55, respectively. The pivotal axis of the lever 57 (Figures 2 and 4) and the axis of the brace rod 19 are disposed upon opposite sides of the opening 53 in the inner wall 26. The roller 52 extends inwardly beneath the lever 57 for engagement thereby. Thus, downward movement of the lever 57 will effect a downward movement of the clutch arm 49 (Figures 2 and 4) hence a rearward movement of the shoe 42 away from the drum 38. The leverage in this structure is such that the force of gravity acting upon the handle 13 will overcome the resistance of the spring 51 and cause said handle to move downwardly until the levers 56 and 57 rest upon the brace rod 19. The left leg 54 of the handle and the left lever 56 are adjustably secured to each other and are pivotally mounted upon the inner wall 28 of the end member 11 in the same manner as said leg 55 and lever 57.

The mower 10 is provided with a ground engaging roller 58 (Figures 1 and 2) at its rearward end which may be rotatably mounted upon a pair of roller brackets 59 in a conventional manner.

While the foregoing described machine constitutes one preferred embodiment of the invention, it is believed evident from Figures 3 and 5 that, with only minor and obvious modifications in the clutch structure, the clutch 37 and floating sprocket 35 may be provided on the reel shaft 23 and that the fixed sprocket 34 may be mounted upon the drive shaft 29 without material change in the results obtained.

Placement of the clutch and control structure in association with one of the sprockets between the shaft 21 and the reel is also possible for accomplishing some of the objectives of the invention but will convert the mower into a so-called "dead reel" type of machine wherein the reel operates only when the mower is moving.

Operation

Since the reel 14 is connected to the power unit 18 (Figures 1 and 2) through the sprockets 22 and 24, the chain 25 and the power shaft 21, said cutting reel 14 will start to rotate as soon as the power unit 18 is started, subject to release by the safety release clutch 24a. The handle 13, due to the urging of gravity, will normally be in its lowered position (Figure 2) with the levers 56 and 57 resting upon the brace rod 19. In such position the lever 57 will be bearing down against the roller 52 on the clutch arm 49 and thereby holding the clutch arm in its lowered position (Figure 2), which keeps the clutch plate 43, hence the clutch shoe 42, away from the clutch drum 38 on the spring clutch 37. The floating sprocket 35 and clutch 37 will be rotated upon the shaft 29 by the reel 14 acting through the sprocket 34 and chain 36. The ground engaging wheels hence the shaft 29, can be rotated as by manually pushing the mower along the ground, but they are completely disconnected from the reel 14 while the handle 13 is in its lowered position (Figure 2).

However, as soon as the handle 13 is raised above its Figure 2 position, the lever 57 will also be raised thereby permitting the clutch arm 49 to be moved upwardly and clockwise (Figures 2 and 4), under the urging of the spring 51. Due to the interengagement of the pin 46a with the walls of the opening 48 in said arm 49, said upward movement of the clutch arm 49 will effect a forward movement of the clutch plate 43 thereby causing its clutch shoe 42 to engage the clutch drum 38 on the clutch 37. This engagement of the clutch drum 38 by the clutch shoe 42 will effect a drag upon the rotation of the clutch drum 38 thereby causing the clutch spring 39 to be tightened upon, and seize, the drive shaft 29. Thereupon, the drive shaft 29 will rotate with the sprocket 35, hence with the cutting reel 14, which rotation will be transmitted through the pinions 32 and the ring gears 33 to the wheels 15 and 16. As long as the handle 13 is held in the raised position, the clutch shoe 42 will continue to engage the clutch 37 and thereby drivingly connect the wheels 15 and 16 to the cutting reel 14.

As soon as the handle 13 is released by the operator of the mower 10, gravity will urge the handle 13, hence the lever 57, down against the roller 52 and thereby depress the clutch arm 49 until the levers 56 and 57 rest upon the brace rod 19. As the arm 49 is depressed, the clutch shoe 42 is moved away from engagement with the clutch drum 38, which permits the clutch spring 39 to release its grip upon the drive shaft 29 and thereby disengage the driving connection of the wheels 15 and 16 with the cutting reel 14. It will be observed that the operator of the mower can manually depress the handle 13 or simply drop the handle in the same manner above described and let the action of gravity effect the above described disconnection.

Although a particular, preferred embodiment of our invention has been disclosed in detail hereinabove for illustrative purposes, it will be understood that variations or modifications thereof which lie within the scope of this invention are fully contemplated unless specifically stated to the contrary in the appended claims.

We claim:

1. A disconnectible power translating device for a lawn mower having a frame mounting an axle with a ground engaging wheel and rotatably supporting a power driven cutting reel parallel with said axle, comprising: a drive shaft rotatably mounted upon said frame parallel with said axle; gear means drivingly connecting said shaft to said wheel; drive means including a spring clutch for selectively coupling said reel with said shaft to rotate same; a clutch plate pivoted upon said frame and engageable with said clutch for contracting said spring clutch onto said shaft; a clutch arm pivoted upon said frame and engageable with said clutch plate; and a mower handle pivoted upon said frame and engageable with said arm, said plate, arm and handle being pivoted about parallel axes and movement of said handle acting through said clutch arm to effect engagement of said plate onto said clutch.

2. The structure of claim 1 wherein said clutch is mounted upon said shaft, said drive means is operably connected to said reel, and engagement of said clutch by said plate effects said coupling.

3. The structure of claim 1 wherein said clutch plate has two surfaces, the first surface facing said clutch arm and having means thereon engaging said clutch arm for being moved thereby, the second surface facing away from said clutch arm and having clutch arm engaging means formed thereon in a position symmetrical with respect to said first named clutch arm engaging means so that said clutch plate can be reversed to place said second surface in a position facing said clutch arm and having the clutch arm engaging means thereon in engagement with said clutch arm.

4. The structure of claim 3 wherein said clutch arm engaging means are bosses formed on the opposed surfaces of the clutch plate.

5. The structure of claim 1 wherein the axis of said axle is disposed between, and substantially co-planar with, the axes of said reel and said shaft.

6. The structure of claim 1 wherein said drive means is comprised of a pair of sprockets, one on said shaft and one on said reel, connected by a chain, and said clutch is supported upon, and rotatable with, one of said sprockets.

7. The structure of claim 1 wherein said drive means is comprised of a pair of sprockets, one on said shaft and one on said reel, connected by a chain, and said clutch is supported upon, and rotatable with, the sprocket on said shaft.

8. The structure of claim 1 wherein said clutch arm is pivotally supported upon said axle, said clutch plate is slidably supported upon said axle for movement toward and away from said clutch, said plate is pivotally engaged by said arm at a point spaced from said axle, and resilient means extending between said frame and said arm urges said plate toward said clutch.

9. The structure of claim 8 wherein said handle, if released during operation, will drop and cause said arm to move said plate away from said clutch against the urging of said spring, thereby uncoupling said drive means.

10. In a power driven lawn mower, the combination comprising: a frame having ground engaging wheels thereon; a cutting reel having a shaft rotatably supported upon said frame parallel with the axis of said wheels; a drive shaft rotatably supported upon said frame parallel with said reel shaft; gear means drivingly connecting said drive shaft to said wheels; drive means driven by said reel shaft and rotatably mounted on said drive shaft; a clutch for selectively coupling said drive means with said drive shaft; a clutch plate pivoted upon said frame and engageable with said clutch to cause said clutch to drivingly couple said drive means and said drive shaft; a clutch arm pivoted upon said frame and engageable with said clutch plate; and a mower handle pivoted upon said frame and engageable with said arm, said plate, arm and handle being pivoted about parallel axes so that movement of said handle, acting through said clutch arm, effects engagement of said plate onto said clutch.

References Cited in the file of this patent

UNITED STATES PATENTS

| | | |
|---|---|---|
| 1,401,156 | Jenkins | Dec. 27, 1921 |
| 2,151,659 | Funk | Mar. 21, 1939 |
| 2,689,620 | Hainke | Sept. 21, 1954 |